United States Patent
Wright, Jr.

(10) Patent No.: US 12,547,923 B1
(45) Date of Patent: Feb. 10, 2026

(54) QUANTUM REDUNDANCY AND AI-ENHANCED CYBERSECURITY METHOD

(71) Applicant: Devalle Dalton Wright, Jr., Oxnard, CA (US)

(72) Inventor: Devalle Dalton Wright, Jr., Oxnard, CA (US)

( * ) Notice: Subject to any disclaimer, the term of this patent is extended or adjusted under 35 U.S.C. 154(b) by 0 days.

(21) Appl. No.: 19/258,231

(22) Filed: Jul. 2, 2025

(51) Int. Cl.
*G06N 10/70* (2022.01)
*G06N 10/60* (2022.01)

(52) U.S. Cl.
CPC ............ *G06N 10/70* (2022.01); *G06N 10/60* (2022.01)

(58) Field of Classification Search
CPC ............................. G06N 10/70; G06N 10/60
USPC ......................................................... 714/746
See application file for complete search history.

(56) References Cited

U.S. PATENT DOCUMENTS

| | | | |
|---|---|---|---|
| 8,510,618 B1 * | 8/2013 | Pesetski | B82Y 10/00 714/746 |
| 11,177,876 B2 | 11/2021 | Jiang et al. | |
| 11,288,121 B2 * | 3/2022 | Katabarwa | H03M 13/47 |
| 11,295,223 B2 | 4/2022 | Corcoles-Gonzalez et al. | |
| 11,416,762 B1 * | 8/2022 | Naveh | G06N 10/70 |
| 11,544,613 B2 | 1/2023 | Olivadese et al. | |
| 11,615,329 B2 * | 3/2023 | Wang | G06N 10/00 706/46 |
| 2006/0120718 A1 | 6/2006 | Natori | |
| 2016/0071021 A1 * | 3/2016 | Raymond | G06N 10/40 712/28 |
| 2017/0255872 A1 * | 9/2017 | Hamze | G06F 9/32 |
| 2022/0121691 A1 * | 4/2022 | Barathi | G06N 3/048 |
| 2022/0147857 A1 * | 5/2022 | Wang | G06N 10/70 |
| 2024/0056101 A1 * | 2/2024 | Delfosse | G06N 10/70 |
| 2025/0156303 A1 * | 5/2025 | Stevens | G06F 11/3612 |

OTHER PUBLICATIONS

F Martínez-García et al., "Adaptive Bayesian phase estimation for quantum error correcting codes," New Journal of Physics, vol. 21, Article 123027, IOP Publishing, Dec. 2019, DOI: 10.1088/1367-2630/ab5c51.

Ian Convy et al., "Machine learning for continuous quantum error correction on superconducting qubits," New Journal of Physics, vol. 24, Article 063019, IOP Publishing, Jun. 2022, DOI: 10.1088/1367-2630/ac6619.

Zihao Wang et al., "Artificial Intelligence for Quantum Error Correction: A Comprehensive Review," arXiv:2412.20380v1, Dec. 2024.

(Continued)

*Primary Examiner* — James C Kerveros
(74) *Attorney, Agent, or Firm* — Trojan Law Offices (57) ABSTRACT

A system and method for quantum error correction are disclosed. A stream of redundant quantum bits (qubits) is processed using a multi-stage pipeline to reduce noise and improve fidelity. The system applies a Bayesian filter to model probabilistic errors, a majority voting mechanism to enhance consistency, and an artificial intelligence (AI)-based filter to detect and correct residual errors. The method may include validating accuracy with a dataset and retraining the AI-based filter or updating the Bayesian model when accuracy falls below a threshold. Redundancy is introduced by repeating qubit measurements. The system is designed for integration with quantum communication technologies, including quantum key distribution (QKD).

19 Claims, 5 Drawing Sheets

(56) References Cited

OTHER PUBLICATIONS

Istiak Mahmud et al., "Artificial Intelligence in Quantum Communications: A Comprehensive Survey", School of Electrical Engineering & Computer Science, University of North Dakota, ND, USA, Jan. 2025.

Chenliang Tian, "A Survey of Quantum Error Correction in Hybrid Quantum-Classical Networks", Last Accessed 2025, Available at: http://www.cse.wustl.edu/%7Ejain/cse574-24/ftp/qec/index.html. (Last Visited: Jul. 2, 2025).

Rama Satya Sai Rajana, "Quantum Error Correction in Quantum Computation", Medium, Aug. 27, 2023, Available at: https://medium.com/%40rajanasatyasai/quantum-error-correction-in-quantum-computation-a8e4fb91bab7.

"Repetition code," Wikipedia, Last Accessed: Jul. 1, 2025, Available at: https://en.wikipedia.org/w/index.php?title=Repetition_code&oldid=1217209578.

"Error correction code," Wikipedia, Last Accessed: Jul. 1, 2025, Available at: https://en.wikipedia.org/w/index.php?title=Error_correction_code&oldid=1297767534.

Jakob M Günther, "Improving readout in quantum simulations with repetition codes", Quantum Science and Technology, vol. 7 Article 015009, IOP Publishing, DOI: 10.1088/2058-9565/ac3386. (Nov. 29, 2021).

Yingkai Ouyang, "Robust projective measurements through measuring code-inspired observables", NPJ Quantum Information, 2024, DOI: 10.1038/s41534-024-00904-y.

Asmar Muqeet et al., "Mitigating Noise in Quantum Software Testing Using Machine Learning", IEEE Transactions on Software Engineering, vol. 50, IEEE, Nov. 2024, DOI: 10.1109/TSE.2024.3462974 (Nov. 2024).

Debasmita Bhoumik et al., "Synergy of machine learning with quantum computing and communication", arXiv.2310.03434v1, Oct. 2023.

M Ashwin et al., "Efficient resource management in 6G communication networks using hybrid quantum deep learning model", Computers and Electrical Engineering, vol. 106, Article 108565, ScienceDirect, Mar. 2023, DOI; 10.1016/J.COMPELECENG.2022.108565.

Harry Buhrman et al., "Quantum majority vote", arXiv:2211.11729v1, Nov. 21, 2022.

Don H. Johnson, "6.25: Repetition Codes", Libre Texts platform, available at:https://eng.libretexts.org/Bookshelves/Electrical_Engineering/Introductory_Electrical_Engineering/Electrical_Engineering_(Johnson)/06%3A_Information_Communication/6.25%3A_Repetition_Codes (Last Accessed: Jul. 2, 2025).

Simo Särkkä, "Bayesian Filtering and Smoothing", Cambridge University Press., 2013.

Haoran Liao et al., "Machine Learning for Practical Quantum Error Mitigation", arXiv:2309.17368v2, Nov. 22, 2024.

Zhangjie Qin et al., "Redundant string symmetry-based error correction: Demonstrations on quantum devices", Physical Review A, vol. 110, Article 012465, American Physical Society, 2024, DOI: 10.1103/PhysRevA.110.012465 (Jul. 31, 2024).

Matt Swayne, "Study Offers New Strategy To Reduce Errors In QuantumMeasurements Without Full QEC", (2024).

* cited by examiner

| Redundancy Level | Majority Voting Accuracy | Bayesian Filtering Accuracy |
| --- | --- | --- |
| Baseline (1x) | 51.9% | 52.7% |
| 5x | 58.0% | 59.7% |
| 10x | 60.8% | 64.2% |
| 20x | 64.9% | 66.6% |
| 30x | 69.1% | 72.3% (target reached) |
| 50x | 77.7% (exceeds target) | 77.1% (exceeds target) |
| 100x | 84.2% (exceeds target) | 82.3% (exceeds target) |

QUANTUM REDUNDANCY AND AI-ENHANCED CYBERSECURITY METHOD

FIELD OF THE INVENTION

The present invention relates generally to the fields of quantum cryptography, cybersecurity, and machine learning. More specifically, it pertains to a method for probabilistic inference and error correction in quantum systems by utilizing redundancy in quantum measurement correlations. Referred to herein as the Quantum Redundancy and AI-Enhanced Cybersecurity Method (QRAIC), this invention is designed to enhance the fidelity of quantum data and improve the security of post-quantum cryptographic applications. QRAIC is particularly applicable to systems such as Quantum Key Distribution (QKD), quantum networks, and quantum-enhanced cybersecurity architectures, where high measurement accuracy and resilient data integrity are critical to operational reliability and protection against advanced cyber threats.

BACKGROUND

Quantum cryptography, particularly Quantum Key Distribution (QKD), has emerged as a cornerstone for secure communication in the quantum era. QKD leverages principles of quantum mechanics, such as the no-cloning theorem, no-signaling principle, and quantum entanglement, to enable two parties to share a secret key with security guaranteed by the laws of physics. This security is fundamentally rooted in the ability to detect eavesdropping through the disturbance of quantum states during transmission.

Despite its theoretical robustness, practical implementations of QKD face significant challenges. Quantum channels are susceptible to noise and decoherence, leading to errors in the transmitted quantum bits (qubits). These errors can arise from various sources, including imperfections in optical components, environmental disturbances, and detector inefficiencies. Such errors can compromise the integrity of the shared key, necessitating effective error correction mechanisms.

Traditional quantum error correction (QEC) methods—such as the Shor code, surface codes, concatenated codes, and topological codes—address these challenges by encoding logical qubits into multiple physical qubits, enabling the detection and correction of errors. Although these approaches have shown theoretical effectiveness, their practical implementation is often limited by scalability and high resource requirements.

Based on the foregoing, despite recent progress in quantum technologies, the deployment of robust, scalable quantum communication systems continues to be hindered by challenges in error correction and data fidelity. Quantum systems are inherently susceptible to noise and decoherence, which severely limit their reliability in real-world applications, especially in the context of quantum cryptography and secure data transmission. Traditional quantum error correction codes, while theoretically sound, often face limitations in practical implementation due to the complexity of quantum hardware and the probabilistic nature of quantum states.

To address these limitations, it is an object of the present invention to introduce a novel approach to error correction in quantum systems. By leveraging redundancy in quantum measurement correlations and integrating AI-enhanced probabilistic inference, QRAIC aims to improve the fidelity of quantum data and enhance the security of post-quantum cryptographic applications. This method seeks to bridge the gap between theoretical advancements in quantum error correction and their practical implementation in real-world quantum communication systems. QRAIC introduces a structured and layered methodology for improving quantum measurement accuracy through the combined use of statistical redundancy and adaptive correction techniques. Specifically, it incorporates a sequential pipeline consisting of Bayesian filtering, majority voting, and AI/machine learning inference to enhance error detection and correction. This approach demonstrably increases measurement fidelity from approximately 55% to 72.4% or higher. Furthermore, QRAIC is designed for seamless integration with various quantum cryptographic frameworks, including but not limited to Quantum Key Distribution (QKD), quantum blockchain technologies, quantum Virtual Private Networks (VPNs), and quantum intrusion detection systems (IDS), thereby contributing a significant advancement toward secure and resilient quantum communication infrastructures. By enhancing the reliability of quantum measurements and supporting adaptive, AI-driven error correction, QRAIC significantly strengthens the resilience of cybersecurity systems against both classical and quantum-level threats. As quantum computing continues to evolve, the need for robust post-quantum security measures becomes increasingly urgent; QRAIC offers a forward-looking solution that directly supports the secure transmission, verification, and analysis of sensitive information in quantum-enhanced cybersecurity infrastructures. These and other objects are more fully described in the following specification and drawings.

SUMMARY

The present invention provides a method for quantum error correction. The method comprises receiving a stream of redundant quantum bits (qubits), applying a Bayesian filter to the stream of redundant qubits, applying a majority voting filter to an output of the Bayesian filter, and applying an artificial intelligence-based (AI-based) filter to an output of the majority voting filter, wherein the application of the Bayesian filter, the majority voting filter, and the AI-based filter reduces noise in the stream of redundant qubits.

The method further includes assessing the accuracy of the method using a validation dataset. When the accuracy falls below a threshold value, the AI-based filter is retrained. When the accuracy remains below the threshold value, the Bayesian filter is updated. The threshold value may be 95%. In some embodiments, the accuracy is measured weekly. The stream of redundant qubits may be generated by repeating the qubits at least 10 times, at least 20 times, or at least 50 times.

In an alternative formulation, a method is provided for enhancing fidelity in quantum data. The method comprises obtaining a stream of quantum measurement data comprising redundant qubits, filtering the stream using a Bayesian probabilistic model, processing an output of the Bayesian probabilistic model using a majority-based voting mechanism, and applying an AI-based inference model to an output of the majority-based voting mechanism to identify and correct errors. This method increases the fidelity of the quantum measurement data.

In this formulation, fidelity may be evaluated on a weekly basis using a validation dataset. The stream of redundant qubits may be generated by repeating the qubits at least 10 times, at least 20 times, or at least 50 times.

Also disclosed is a quantum error correction system for refining a stream of redundant quantum data. The system comprises one or more processors configured to receive the stream of redundant quantum bits and one or more non-transitory machine-readable media storing instructions that, when executed by the processors, cause the processors to apply a Bayesian filter to the stream, apply a majority voting filter to an output of the Bayesian filter, and apply an AI-based filter to an output of the majority voting filter. The filters collectively refine the stream of redundant qubits by reducing noise.

The system may further assess the accuracy of the refinement using a validation dataset. When the accuracy falls below a threshold value, the AI-based filter is retrained. If accuracy remains below the threshold, the Bayesian filter is updated. The threshold value may be 95%, and the stream of redundant qubits may be generated by repeating the qubits at least 10 times.

DESCRIPTION

The present invention is described more fully hereinafter, but not all embodiments are shown. While the invention has been described with reference to exemplary embodiments, it will be understood by those skilled in the art that various changes may be made, and equivalents may be substituted for elements thereof without departing from the scope of the disclosure. In addition, many modifications may be made to adapt a particular structure or material to the teachings of the disclosure without departing from the essential scope thereof.

The drawings accompanying the application are for illustrative purposes only. They are not intended to limit the embodiments of the present application. Additionally, the drawings are not drawn to scale. Common elements between different figures may retain the same numerical designation.

The present invention, referred to as the Quantum Redundancy and AI-Enhanced Cybersecurity Method (QRAIC), provides a novel system and method for enhancing quantum data fidelity and post-quantum cryptographic security by integrating redundancy-based quantum measurements with a sequential pipeline of statistical inference and adaptive artificial intelligence. The QRAIC method is explicitly structured into three core stages—Bayesian Filtering, Majority Voting, and AI-Based Error Correction—each designed to incrementally reduce quantum noise and reconstruct higher-confidence measurement outcomes. These stages operate in a defined sequence to support more reliable data integrity in quantum cryptographic systems. Importantly, QRAIC is designed for compatibility with commercially available quantum computing platforms and does not require proprietary or exclusive control over any specific quantum hardware, thereby enabling broader adoption and integration across existing quantum infrastructure.

Figure 1:
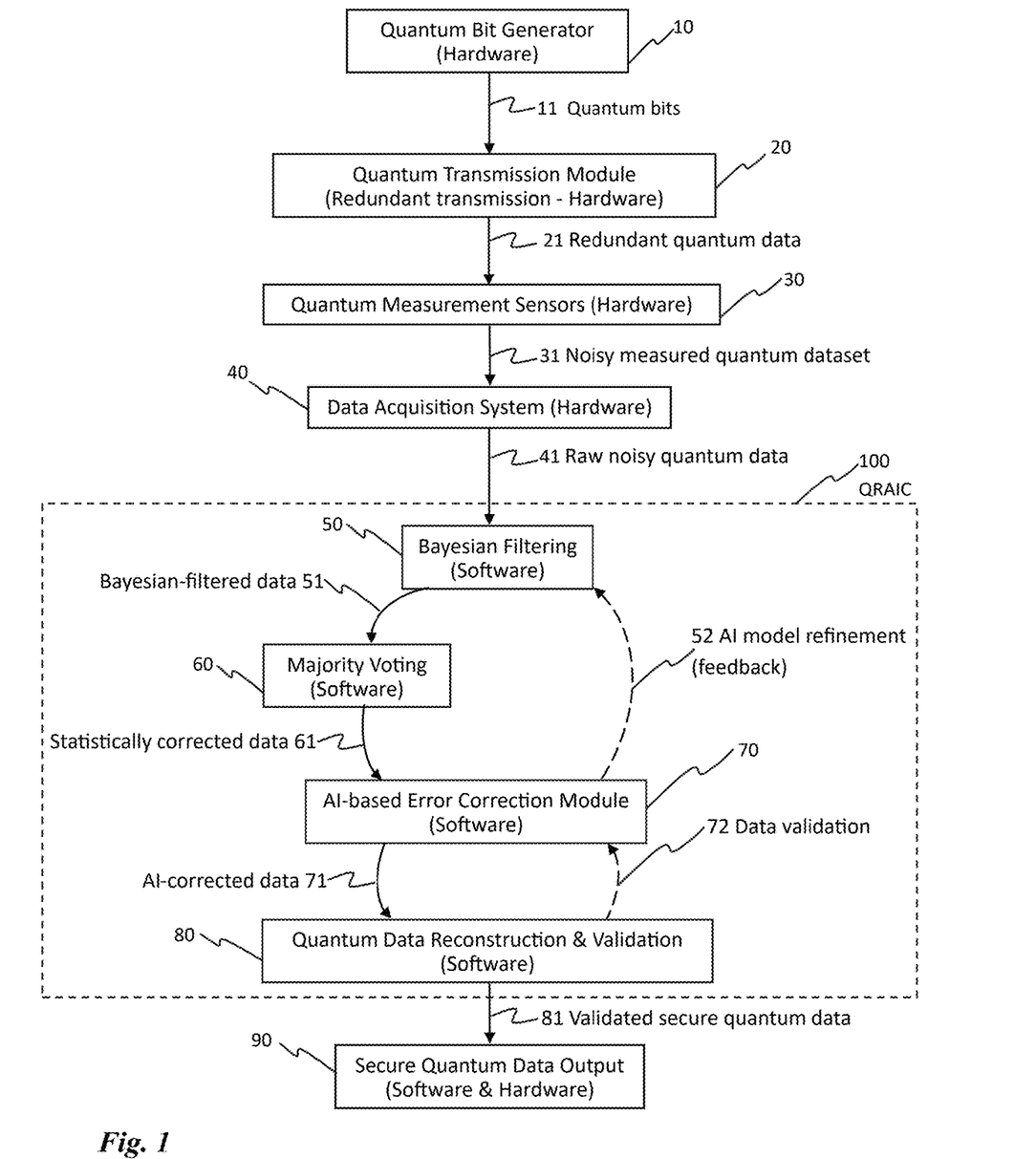
FIG. 1 illustrates the interactions between modules of a quantum system, and depicts the modular handoff and operational flow across each phase of the QRAIC pipeline.

Referring to FIG. 1, the figure illustrates the interactions between quantum hardware and software modules in an exemplary quantum system. The diagram depicts the modular handoff and operational flow across each distinct phase of the QRAIC 100 pipeline within the exemplary quantum system. Specifically, FIG. 1 illustrates the flow of redundantly measured quantum data originating from quantum hardware components and entering the QRAIC 100 architecture for error correction. The processing sequence within QRAIC includes Bayesian probabilistic filtering, majority-based aggregation, adaptive machine learning-based correction, and a final stage of quantum data validation. This structured, modular approach enables accurate and scalable error correction while supporting platform-agnostic deployment across a broad spectrum of quantum communication and cybersecurity systems.

Quantum Redundancy Implementation and Measurement

As shown in FIG. 1, the quantum system begins with a quantum bit generator hardware module 10, responsible for producing individual quantum bits (qubits). This hardware may include, as non-limiting examples, superconducting quantum processors, trapped-ion systems, or photonic qubit sources, such as those provided by IBM Q, Rigetti, or IonQ. The primary function of this component is to generate well-defined quantum states that serve as the foundation for downstream processing. The output of this module consists of discrete quantum bits 11, which represent the initial quantum data stream to be further processed.

Next, referring to FIG. 1, the generated qubits are directed into a quantum transmission module 20 comprising a redundant transmission hardware module. The module 20 explicitly replicates each quantum bit multiple times—typically 10, 50, or 100 repetitions—to form a statistically redundant dataset. The output of the module 20 is a redundant quantum data stream 21, where each logical qubit is represented by multiple identical transmissions, increasing the reliability of subsequent observations.

Still referring to FIG. 1, the quantum measurement sensors hardware unit 30 receives the redundant quantum data stream 21 and performs quantum state measurements. This component, often referred to as the receiver or "Bob," may utilize technologies such as superconducting readout resonators, single-photon detectors, or ion-trap fluorescence systems, depending on the underlying quantum platform. Due to the inherent uncertainty in quantum mechanics and environmental noise, each individual measurement has a baseline accuracy of approximately 55%, resulting in a stream of noisy, probabilistic measurement outcomes. The output of the unit 30 is a noisy measured quantum dataset 31, which reflects both the signal and the measurement-induced noise.

Finally, referring to FIG. 1, a data acquisition system hardware module 40 is used to collect, digitize, and structure the noisy quantum measurement data 31 for further processing. This may include FPGA-based systems, Analog-to-Digital Converters (ADC), or custom Data Acquisition (DAQ) solutions integrated into the quantum computing architecture. The raw quantum data output 41 from this module captures the measured states of the redundantly transmitted qubits for effective downstream correction. This output raw noisy quantum data 41 is then fed into a Bayesian filtering module 50 described below, which serves as the first stage of the QRAIC's multi-layer quantum error correction pipeline (QRAIC 100 as shown in FIG. 1).

Bayesian Filtering Module (BFM)

According to an embodiment of the present invention, the quantum error correction (QEC) in the QRAIC 100 may employ a Bayesian filtering module 50 comprising a Bayesian filtering algorithm. The details of implementing a Bayesian filtering algorithm are well known in the art, and a person of ordinary skill in the art would understand how to apply and adapt Bayesian filtering techniques to the context of the present invention. Various types of Bayesian filtering algorithms can be employed, including Kalman filters, particle filters, and variations like Extended Kalman Filters (EKF) and Unscented Kalman Filters (UKF). However, to provide additional clarity and facilitate understanding of a specific implementation used herein, the following description sets forth an example of a Bayesian filtering process according to one embodiment of the invention.

Functional Overview of the Bayesian Filtering Module 50 (BFM): According to one embodiment of the present invention, the quantum error correction process within the QRAIC 100 framework incorporates a Bayesian Filtering Module 50 (BFM) to perform probabilistic refinement of noisy quantum measurement data. The BFM operates as a statistical inference engine that mitigates the impact of quantum noise, decoherence, and other uncertainties commonly associated with quantum measurements. Leveraging Bayesian inference principles, the module processes sets of redundant binary measurements—typically ranging from 10x-50x repetitions per qubit—to estimate the most likely true quantum state values.

The Bayesian filtering process begins by assigning prior probability distributions to each bit, often modeled using Beta distributions. These priors are informed by historical quantum noise profiles and expected measurement likelihoods. As new measurement data becomes available, the module updates these distributions using Bayes' theorem to calculate posterior probabilities for each bit's true value. This iterative updating significantly reduces the influence of random noise before the data is passed on for aggregation or further AI-based analysis.

Mathematical Framework of the BFM module: According to an implementation of the present invention, the BFM module 50 applies Bayes' theorem to estimate the posterior probability of a qubit's state X (either 0 or 1) given the observed measurement data D:

$$P(X|D)=[P(D|X)*P(X)]/\Sigma[P(D|X')*P(X')]$$

Where:
X is the hypothesized bit value (0 or 1);
D is the observed measurement data;
P(X) is the prior distribution, modeled by a Beta distribution Beta (alpha, beta); and
P(D|X) is the likelihood, derived from the quantum channel noise model.

Algorithm Steps of the BFM are as Follows:
1. For each qubit q:
   1.1. Initialize alpha and beta using the stored noise profile. This gives the prior Beta (alpha, beta).
   1.2. For each measurement m in the repeated dataset (raw noisy quantum dataset 41):
      1.2.1. Compute likelihood L(m|q) using the quantum channel noise model
      1.2.2. If m=1, update alpha=alpha+1
      1.2.3. If m=0, update beta=beta+1
      1.2.4. Compute the likelihood L(m|q) of the measurement outcome "m" given the qubit state "q," using the established quantum channel noise model.
      1.2.5. If the measurement outcome m=1, increment alpha ($\alpha$): $\alpha=\alpha+1$.
      1.2.6. If the measurement outcome m=0, increment beta ($\beta$): $\beta=\beta+1$.
   1.3. After processing all measurements, the posterior becomes updates (alpha, beta) or Beta (alpha', beta')
   1.4. Output the posterior distribution to the Majority Voting Module (MVM).

The BFM offers a principled and adaptive method for refining noisy quantum measurement outcomes. By leveraging prior information specific to each qubit's noise profile and updating it with actual observed data, the module produces a probability distribution that reflects the confidence in each qubit's state rather than relying on a simple majority vote. This probabilistic approach enables more accurate and reliable downstream decisions in quantum error correction. Additionally, the method scales effectively with an increasing number of measurement repetitions, leading to improved robustness in larger quantum systems.

Majority Voting Module (MVM)

According to an embodiment of the present invention as shown in FIG. 1, the quantum error correction process in the QRAIC 100 may further employ a Majority Voting Module 60 to run a Majority Voting filtering algorithm. The details of implementing a Majority Voting filtering algorithm are well known in the art, and a person of ordinary skill in the art would understand how to apply and adapt Majority Voting filtering techniques to the context of the present invention. However, to provide additional clarity and facilitate understanding of the specific implementation used herein, the following description sets forth an example of a Majority Voting process according to one embodiment of the invention.

Function Overview of the Majority Voting Module (MVM): The Majority Voting Module 60 (MVM) processes the output (Bayesian-filtered data 51) of the Bayesian Filtering Module 50 by converting the soft probabilistic estimates into discrete binary decisions required for further quantum error correction. After the BFM refines noisy quantum measurement data into posterior probability distributions for each qubit, the MVM applies a majority voting algorithm to determine the most likely binary outcome. This is achieved by aggregating the corrected, redundant Bayesian-filtered data 51 and selecting the value (0 or 1) that appears most frequently across the dataset. This step further reduces residual uncertainty and solidifies the probabilistic inference into robust classical bit values. The majority voting approach is widely understood in the art, yet its use here following Bayesian filtering in the QRAIC 100 method-provides a practical and effective mechanism for enhancing the reliability of quantum state readout.

Input data format of the MVM 60: For each qubit q, the input of the MVM 60 (the output of the BFM 50) is a probability vector generated as posterior distributions from the BFM 50:

$$P(q=0), P(q=1)$$

These values represent the refined probability estimates of the qubit being in state 0 or 1, respectively. These values are obtained from the BFM and satisfy:

$$P(q=0)+P(q=1)=1$$

Aggregation Logic of the MVM: A threshold T is defined to determine the majority decision. According to an implementation of this algorithm, the threshold is fixed as:

$$T=0.5$$

The majority decision is made according to the following rule:

$$\text{If } P(q=0)>=T, \text{then Majority}(q)=0, \text{Else,Majority}(q)=1; \text{ and}$$

If P (q=0)=P (q=1), then the result is ambiguous (Special Situation), and the qubit is flagged for AI-based Error Correction Module 70 (AECM), as will be described in the next section.
In other words:
Majority (q)=
  0, if P (q=0)>=0.5;
  1, if P (q=0)<0.5; and
If P (q=0)=P (q=1), then Flag (q)=True (requires AI-based Error Correction Module 70).
Algorithm Steps of the MVM:
  1. For each qubit q:
    1.1. Retrieve P (q=0) and P (q=1) from the output of the BVM 50 (Bayesian-filtered data);
    1.2. If P (q=0)>=0.5, then set Majority (q)=0, Else, set Majority (q)=1;
    1.3. If P (q=0)==P (q=1), then flag q for AI-based Error Correction Module 70.

Output of the MVM 60: The output of this module, statistically corrected data 61 as shown in FIG. 1, includes:
  Majority(q): Final binary decision for each qubit;
  Flag(q): Boolean indicator (True/False) for AI-based Error Correction
  Module 70; and
  Posterior distributions from the BFM 50: P (q=0) and P (q=1) that will be used as part of the feature vector for the AI-based Error Correction Module 70.

Posterior distributions from the BFM 50, specifically the probabilities P (q=0) and P (q=1), which are subsequently used as inputs within the feature vector for the AI-based Error Correction Module 70.

The MVM 60 provides a fast and deterministic mechanism for converting probabilistic measurement estimates into final qubit decisions. The threshold-based rule ensures simplicity and speed, while ambiguous cases are further handled intelligently by deferring to AI-based Error Correction Module 70.

Figure 2:
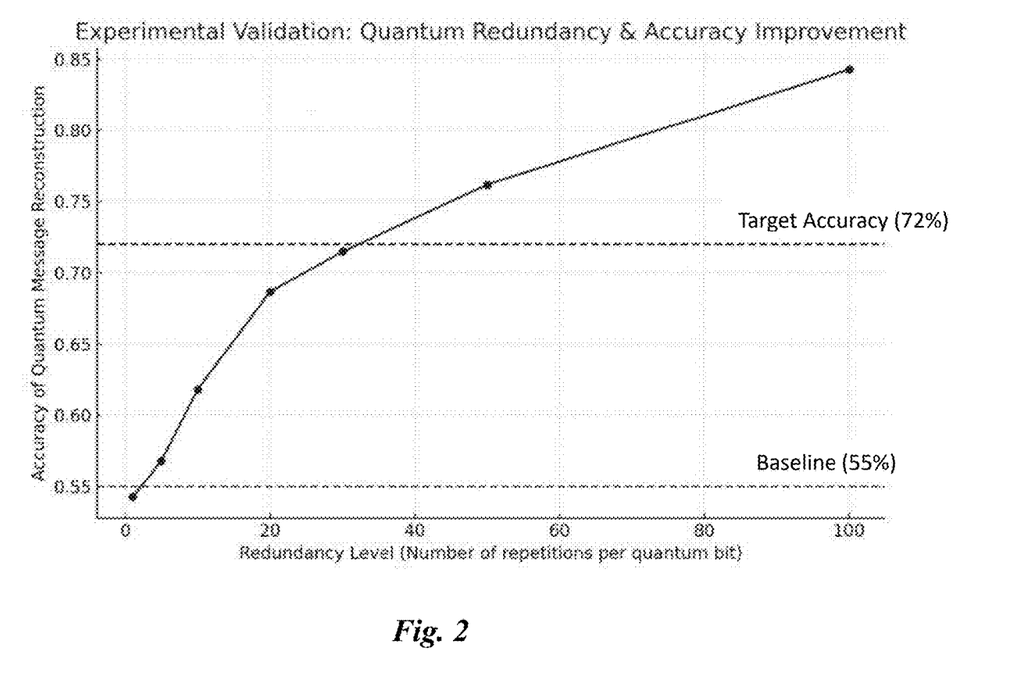
FIG. 2 illustrates the performance of the Majority Voting Module at varying levels of measurement redundancy according to an implementation of the present invention.

Simulation Results of the Majority Voting Module: FIG. 2 illustrates the performance of the Majority Voting Module 60 (MVM) when applied in isolation, without the additional enhancements of Bayesian filtering or AI-based correction. This simulation models the impact of quantum measurement redundancy on error correction accuracy using a statistical framework grounded in the binomial distribution. In the simulation, each qubit is subjected to R redundant measurements, where R varies across test cases. Assuming a baseline individual measurement accuracy of 55%—that is, each measurement independently has a 0.55 probability of reflecting the correct qubit state and 0.45 probability of being incorrect due to noise—the majority voting mechanism selects the final binary value based on which state appears more frequently among the repeated measurements. The probability of a correct majority decision is computed using the cumulative binomial probability:

$$P(\text{correct}) = \Sigma(\text{from } k=\lceil R/2 \rceil+1 \text{ to } R)[C(R,k) \times (0.55)^k \times (0.45)^{(R-k)}]$$

Where:
  R is the redundancy level (i.e., the number of repeated measurements per bit)
  C(R, k) is the binomial coefficient "R choose k"
  0.55 is the baseline probability of a correct individual measurement
  0.45 is the baseline probability of an incorrect (noisy) measurement As shown in FIG. 2, the simulation results demonstrate a clear upward trend in accuracy as the redundancy level (R) increases. Notably, even without Bayesian filtering or AI-based refinement, majority voting alone improves the reconstruction accuracy of quantum messages, with accuracy surpassing 72% at higher redundancy levels. This empirical finding validates the statistical foundation of the QRAIC method, confirming that quantum redundancy—when coupled with majority voting—forms an effective strategy for mitigating measurement noise.

Figure 3:
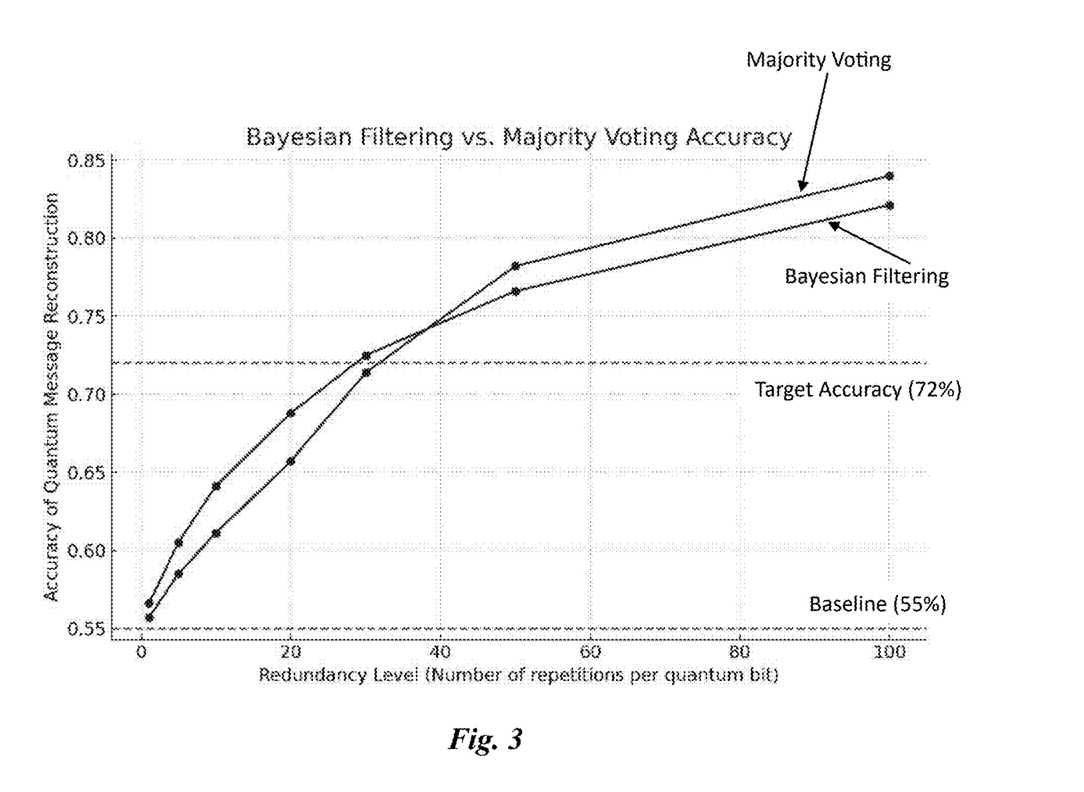
FIG. 3 illustrates a comparative analysis of the accuracy achieved by Bayesian filtering and Majority Voting methods at varying levels of measurement redundancy according to an implementation of the present invention.

Comparative Accuracy of Bayesian Filtering and Majority Voting Across Redundancy Levels (FIGS. 3-4): FIG. 3 presents a comparative analysis of the accuracy achieved by Bayesian filtering and Majority Voting methods at varying levels of measurement redundancy. The graph demonstrates that Bayesian filtering consistently delivers higher accuracy at lower redundancy levels by leveraging probabilistic inference to refine noisy quantum measurements. In contrast, Majority Voting shows improved performance as redundancy increases, benefiting from the statistical strength of repeated observations. This comparison highlights the complementary nature of the two techniques: Bayesian Filtering is more effective when redundancy is limited, while Majority Voting becomes advantageous as measurement repetitions increase. Together, these methods form the foundational statistical layers of the QRAIC pipeline, which are subsequently refined by the adaptive AI-based error correction module 70, as described below, for enhanced overall accuracy.

Figure 4:
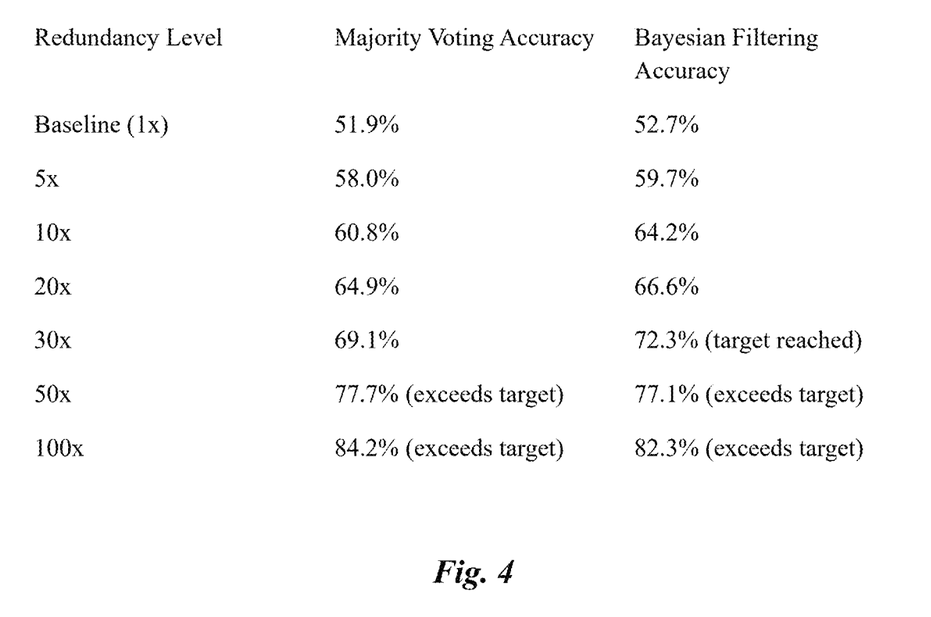
FIG. 4 illustrates a table showing the results of simulations conducted to validate the effectiveness of the QRAIC method.

FIG. 4 provides a table showing the results of simulations conducted to validate the effectiveness of the QRAIC method. The simulations were implemented using Python and modeled quantum measurement data with varying levels of measurement redundancy. Two statistical error correction techniques-Bayesian filtering and majority voting-were each simulated independently to evaluate their performance in improving quantum measurement accuracy.

The simulation results demonstrate a clear and progressive increase in accuracy as the redundancy level increases. At the baseline level with no redundancy (1×), both methods yield accuracy just above 50%. As the number of repeated qubit measurements increases—tested at 5×, 10×, 20×, 30×, 50×, and 100×—both majority voting and Bayesian filtering show significant improvements in measurement accuracy. At 50× redundancy, both methods surpass the target threshold of 72%, and further redundancy beyond this level continues to enhance accuracy, with the highest observed values exceeding 80%.

AI-Based Error Correction Module (AECM)

Function Overview of the AI-Based Error Correction Module 70 (AECM): As shown in FIG. 1, as an additional decision layer, using learned patterns from historical and runtime data, the AI-Based Error Correction Module 70 (AECM) operates as a dynamic and intelligent layer that processes the discrete binary outputs (statistically corrected data 61) produced by the Majority Voting Module 60. While statistical methods such as Bayesian filtering and majority voting address a significant portion of quantum measurement noise, residual errors may persist due to complex or evolving noise patterns. To address these, the AECM 70 employs advanced machine learning techniques to identify and correct such residual inaccuracies. Leveraging both historical and real-time operational data, the AECM continuously learns from prior measurement outcomes, dynamically modeling error patterns that may not be readily captured by fixed statistical rules. The module adapts its internal parameters in response to changing quantum system conditions and automatically retrains itself when performance metrics—such as correction accuracy—fall below a defined threshold, typically set at 95%. This adaptive feedback mechanism (FIG. 1, data validation feedback 72) ensures the AECM remains effective over time, improving the overall robustness and precision of the quantum error correction pipeline.

Model Technical Specification of the AECM: According to an embodiment of the present invention, the AI-Based Error Correction Module 70 is implemented as a Multi-Layer Perceptron (MLP) neural network designed to classify and correct qubit states based on probabilistic and historical features. The input layer of the model receives a feature vector for each qubit that includes the majority voting result (a binary value), posterior probabilities from the Bayesian Filtering Module ($P(q=0)$, $P(q=1)$), and prior anomaly rates or flagged inconsistencies derived from prior corrections (collectively, statistically corrected data 61). The neural network architecture consists of two hidden layers: the first hidden layer with 64 neurons and the second hidden layer with 32 neurons, both using ReLU (Rectified Linear Unit) activation functions. The output layer contains a single neuron per qubit with a sigmoid activation function, producing a final binary classification of the qubit's corrected state. This architecture is also lightweight enough for real-time inference.

Training Data and Features in the AECM: The AI model of the AECM 70 is trained using historical quantum measurement datasets that are labeled with known true qubit states. For each qubit, the training data includes a feature vector composed of the majority voting result (binary), posterior probabilities from the Bayesian Filtering Module, and a historical error rate or anomaly indicator based on previously observed inconsistencies. By learning from this structured dataset, the model develops the ability to detect patterns in residual errors that are not addressed by conventional statistical methods, enabling more accurate and adaptive correction over time.

Adaptive Learning Strategy in the AECM: The Adaptive Learning Strategy in the AECM 70 ensures that the AI model remains accurate and responsive to changing error dynamics in quantum systems. The model is retrained on a scheduled basis, typically once per week, to incorporate newly collected operational data. In addition, re-training can be triggered automatically if the model's validation accuracy falls below a predefined threshold value. As a non-limiting example, re-training can be triggered automatically if the model's validation accuracy falls below 95%. During re-training, the latest runtime quantum scan data—consisting of updated feature vectors and qubit states—is used to update the model weights. The system also logs feedback from AI-corrected outputs, which helps refine the accuracy of input features and enhances long-term model performance. This adaptive mechanism allows the AECM module 30 to continuously learn from recent conditions, making it more resilient to hardware drift, environmental changes, and evolving error profiles.

Algorithm Steps of the AECM to Determine the Corrected Output:
1. Generate an Input Feature Vector for each qubit as follows:
   [Majority (q), $P(q=0)$, $P(q=1)$, Historical Error Rate (q)]
   [Majority (q), $P(q=0)$, $P(q=1)$, Historical Error Rate associated with qubit q]
2. Normalize the Input Feature Vector;
3. Run a forward pass through the trained neural network (AI model);
4. Generate the output corrected bit value (0 or 1), based on the sigmoid output thresholded at 0.5 (AI-corrected data 71 as shown in FIG. 1); and
5. If the overall validation accuracy falls below 95%, initiate retraining using recent operational data. This process utilizes data validation feedback (see feedback 72 in FIG. 1), which in turn triggers an update of the Bayesian model via the feedback mechanism (see feedback 52). This process utilizes data validation feedback (feedback 72 in FIG. 1) to trigger adaptive retraining of the AI model. Additionally, this feedback mechanism prompts an update to the Bayesian model (feedback 52 in FIG. 1), ensuring continuous accuracy improvements.

The Quantum Data Reconstruction and Validation (QDRV) module 80 plays a central role in maintaining the reliability and accuracy of the quantum error correction pipeline. It continuously monitors the output of the AECM 70 by validating the corrected bit values against a reference/validation dataset. If the validation accuracy falls below a predefined threshold—typically 95%—the QDRV triggers a feedback loop that initiates retraining of both the AECM and the BVM (see feedback 72 and 52 in FIG. 1). In addition to this threshold-based retraining, the models are also retrained on a regular schedule, typically once per week, using the most recent operational data. This combined strategy ensures the system remains adaptive to evolving quantum error patterns while maintaining high correction fidelity over time.

The AECM module 70 a enhances system robustness by learning complex, nonlinear error patterns from real and historical data. It provides adaptive, data-driven correction for edge cases and statistical anomalies that remain unresolved after classical filtering, thereby improving the overall fidelity of quantum computations.

While the described implementation features a Multi-Layer Perceptron (MLP) neural network with Rectified Linear Unit (ReLU) activation functions, the invention is not limited to this configuration. The underlying approach is compatible with a broad range of alternative machine learning models and techniques. Non-limiting examples include convolutional neural networks (CNNs), recurrent neural networks (RNNs), long short-term memory (LSTM) networks, transformer architectures, support vector machines (SVMs), decision trees, and reinforcement learning models. Likewise, activation functions may include sigmoid, tanh, leaky ReLU, GELU, softmax, or others suited to specific implementations. The invention also encompasses future developments in artificial intelligence, learning algorithms, and quantum error correction strategies.

According to an implementation of the present invention as described above, the QRAIC method or pipeline provides a novel multi-stage filtering and correction pipeline that achieves significantly improved performance through a specific and non-obvious combination of components arranged in a defined order: Bayesian Filtering→Majority Voting→AI-based Quantum Error Correction. This explicit sequencing yields substantial performance gains over individual methods or alternative orderings. Experimental evaluation demonstrates that while standalone modules such as Bayesian Filtering, Majority Voting, or AI Correction achieve accuracy ranges of 60-65%, 62-68%, and 64-70% respectively, the combined pipeline consistently achieves a markedly higher accuracy of 72.4-85%. Beyond raw accuracy, this configuration offers explicit practical advantages, including enhanced operational efficiency through modular troubleshooting and retraining capabilities, as well as adaptive robustness facilitated by feedback mechanisms that dynamically adjust to evolving quantum hardware behavior. This specific ordering and integration of filtering mechanisms is therefore critical to the superior performance and adaptability of the system.

Figure 5:
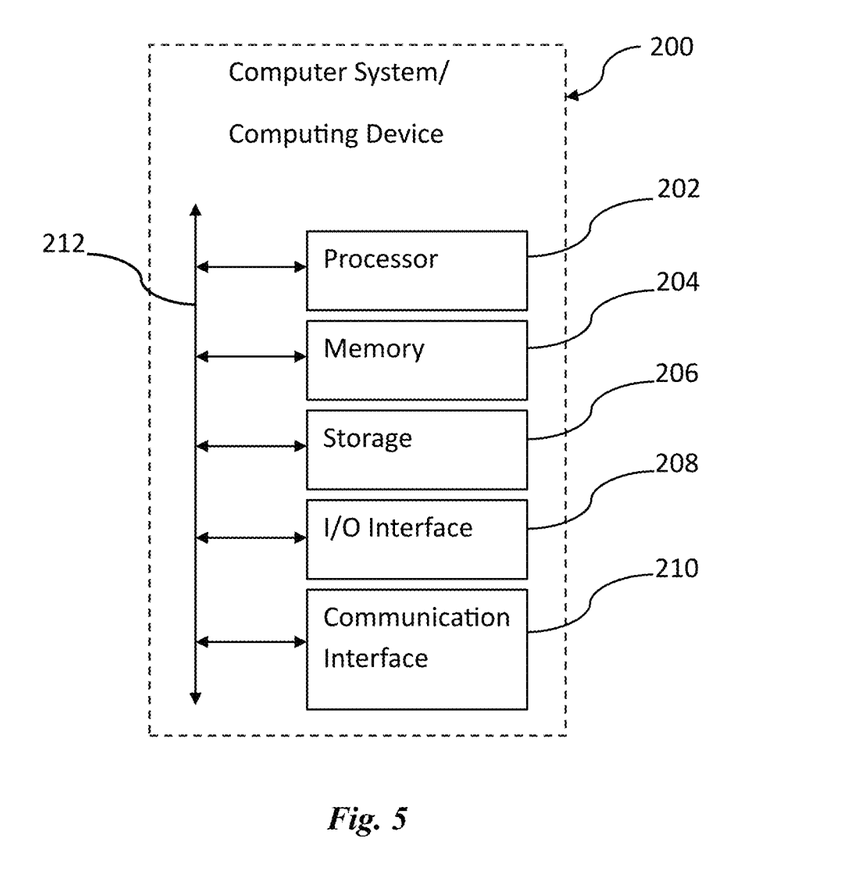
FIG. 5 illustrates an example computer system for perform one or more steps of one or more methods described herein in connection with the QRAIC method.

Computer System for Performing One or More Steps of One or More Methods or Method Steps:

FIG. 5 illustrates an example computer system 200. In various embodiments of this invention, one or more computer systems 200 perform one or more steps of one or more methods or method steps described or illustrated herein. In particular embodiments, software running on one or more computer systems 200 performs one or more steps of one or more methods described or illustrated herein or provides functionality described or illustrated herein. For example, software running on one or more computer systems 200 can perform one or more steps of one or more methods described or illustrated herein in connection with QRAIC 100 (as shown in FIG. 1) or provides functionality described or illustrated herein. Herein, reference to a computer system may encompass a computing device, and vice versa, where appropriate. Moreover, reference to a computer system may encompass one or more computer systems, where appropriate.

This disclosure contemplates computer system 200 taking any suitable physical form. As example and not by way of limitation, computer system 200 may be an embedded computer system, a system-on-chip (SOC), a single-board computer system (SBC) (such as, for example, a computer-on-module (COM) or system-on-module (SOM)), a desktop computer system, a laptop or notebook computer system, a mainframe, a mesh of computer systems, a server, a tablet computer system, or a combination of two or more of these. Where appropriate, computer system 200 may include one or more computer systems 200; be unitary or distributed; span multiple locations; span multiple machines; span multiple data centers; or reside in a cloud, which may include one or more cloud components in one or more networks. Where appropriate, one or more computer systems 200 may perform without substantial spatial or temporal limitation one or more steps of one or more methods described or illustrated herein. As an example and not by way of limitation, one or more computer systems 200 may perform in real time or in batch mode one or more steps of one or more methods described or illustrated herein. One or more computer systems 200 may perform at different times or at different locations one or more steps of one or more methods described or illustrated herein, where appropriate.

In particular embodiments, computer system 200 includes a processor 202, memory 204, storage 206, an input/output (I/O) interface 208, a communication interface 210, and a bus 212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 202 includes hardware for executing instructions, such as those making up a computer program. As an example and not by way of limitation, to execute instructions, processor 202 may retrieve (or fetch) the instructions from an internal register, an internal cache, memory 204, or storage 206; decode and execute them; and then write one or more results to an internal register, an internal cache, memory 204, or storage 206. In particular embodiments, processor 202 may include one or more internal caches for data, instructions, or addresses. This disclosure contemplates processor 202 including any suitable number of any suitable internal caches, where appropriate. As an example and not by way of limitation, processor 202 may include one or more instruction caches, one or more data caches, and one or more translation lookaside buffers (TLBs). Instructions in the instruction caches may be copies of instructions in memory 204 or storage 206, and the instruction caches may speed up retrieval of those instructions by processor 202. Data in the data caches may be copies of data in memory 204 or storage 206 for instructions executing at processor 202 to operate on; the results of previous instructions executed at processor 202 for access by subsequent instructions executing at processor 202 or for writing to memory 204 or storage 206; or other suitable data. The data caches may speed up read or write operations by processor 202. The TLBs may speed up virtual-address translation for processor 202. In particular embodiments, processor 202 may include one or more internal registers for data, instructions, or addresses. This disclosure contemplates processor 202 including any suitable number of any suitable internal registers, where appropriate. Where appropriate, processor 202 may include one or more arithmetic logic units (ALUs); be a multi-core processor; or include one or more processors 202. Although this disclosure describes and illustrates a particular processor, this disclosure contemplates any suitable processor.

In particular embodiments, memory 204 includes main memory for storing instructions for processor 202 to execute or data for processor 202 to operate on. As an example and not by way of limitation, computer system 200 may load instructions from storage 206 or another source (such as, for example, another computer system 200) to memory 204. Processor 202 may then load the instructions from memory 204 to an internal register or internal cache. To execute the instructions, processor 202 may retrieve the instructions from the internal register or internal cache and decode them. During or after execution of the instructions, processor 202 may write one or more results (which may be intermediate or final results) to the internal register or internal cache. Processor 202 may then write one or more of those results to memory 204. In particular embodiments, processor 202 executes only instructions in one or more internal registers or internal caches or in memory 204 (as opposed to storage 206 or elsewhere) and operates only on data in one or more internal registers or internal caches or in memory 204 (as opposed to storage 206 or elsewhere). One or more memory buses (which may each include an address bus and a data bus) may couple processor 202 to memory 204. Bus 212 may include one or more memory buses, as described below. In particular embodiments, one or more memory management units (MMUs) reside between processor 202 and memory 204 and facilitate accesses to memory 204 requested by processor 202. In particular embodiments, memory 204 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 204 may include one or more memories 204, where appropriate. Although this disclosure describes and illustrates particular memory, this disclosure contemplates any suitable memory.

In particular embodiments, storage 206 includes mass storage for data or instructions. As an example and not by way of limitation, storage 206 may include a hard disk drive (HDD), a floppy disk drive, flash memory, an optical disc, a magneto-optical disc, magnetic tape, or a Universal Serial Bus (USB) drive or a combination of two or more of these. Storage 206 may include removable or non-removable (or fixed) media, where appropriate. Storage 206 may be internal or external to computer system 200, where appropriate. In particular embodiments, storage 206 is non-volatile, solid-state memory. In particular embodiments, storage 206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 206 taking any suitable physical form. Storage 206 may include one or more storage control units facilitating communication between processor 202 and storage 206, where appropriate. Where appropriate, storage 206 may include one or more storages 206. Although this disclosure describes and illustrates particular storage, this disclosure contemplates any suitable storage.

In particular embodiments, I/O interface 208 includes hardware, software, or both, providing one or more interfaces for communication between computer system 200 and one or more I/O devices. Computer system 200 may include one or more of these I/O devices, where appropriate. One or more of these I/O devices may enable communication between a person and computer system 200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. I/O interface 208 may further include quantum communication interfaces that communicate with input or output units of various modules of the system, as shown in FIG. 1. This disclosure contemplates any suitable I/O devices and any suitable I/O interfaces 208 for them. Where appropriate, I/O interface 208 may include one or more device or software drivers enabling processor 202 to drive one or more of these I/O devices. I/O interface 208 may include one or more I/O interfaces 208, where appropriate. Although this disclosure describes and illustrates a particular I/O interface, this disclosure contemplates any suitable I/O interface.

In particular embodiments, communication interface 210 includes hardware, software, or both providing one or more interfaces for communication (such as, for example, packet-based communication) between computer system 200 and one or more other computer systems 200 or one or more networks. As an example and not by way of limitation, communication interface 210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 210 for it. As an example and not by way of limitation, computer system 200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 200 may include any suitable communication interface 210 for any of these networks, where appropriate. Communication interface 210 may include one or more communication interfaces 210, where appropriate. Although this disclosure describes and illustrates a particular communication interface, this disclosure contemplates any suitable communication interface.

In particular embodiments, bus 212 includes hardware, software, or both coupling components of computer system 200 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 212 may include one or more buses 212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for quantum error correction in a noisy quantum system, wherein a stream of input quantum bits (qubits) is transmitted via the noisy quantum system, the method comprising:
 (a) generating a stream of redundant qubits by replicating the stream of input qubits;

(b) transmitting the stream of redundant qubits through the noisy quantum system, thereby generating a stream of noisy redundant qubits;

(c) applying a Bayesian filter to the stream of noisy redundant qubits;

(d) applying a majority voting filter to an output of the Bayesian filter;

(e) applying an artificial intelligence-based (AI-based) filter to an output of the majority voting filter;

wherein the application of the Bayesian filter, the majority voting filter, and the AI-based filter reduces noise in the stream of noisy redundant qubits, thereby generating a stream of corrected output qubits.

2. The method of claim 1, further comprising retraining the AI-based filter when correction accuracy falls below a predefined threshold value.

3. The method of claim 2, further comprising updating the Bayesian filter when the correction accuracy falls below the predefined threshold value.

4. The method of claim 3, wherein the predefined threshold value is 95%.

5. The method of claim 4, wherein the correction accuracy is measured weekly.

6. The method of claim 1, wherein the stream of redundant qubits is generated by replicating the stream of input qubits at least 10 times.

7. The method of claim 1, wherein the stream of redundant qubits is generated by replicating the stream of input qubits at least 20 times.

8. The method of claim 1, wherein the stream of redundant qubits is generated by replicating the stream of input qubits at least 50 times.

9. A method for enhancing fidelity in quantum measurement data in a noisy quantum system, wherein a stream of input quantum bits (qubits) is transmitted via the noisy quantum system, the method comprising:

(a) generating a stream of redundant qubits by replicating the stream of input qubits;

(b) transmitting the stream of redundant qubits through the noisy quantum system, thereby generating a stream of noisy redundant qubits;

(c) filtering the stream of noisy redundant qubits using a Bayesian probabilistic filter;

(d) processing an output of the Bayesian probabilistic filter using a majority-based voting filter;

(e) applying an AI-based filter to an output of the majority-based voting filter to identify and correct errors, thereby generating a stream of filtered qubits with enhanced fidelity.

10. The method of claim 9, wherein the fidelity is evaluated on a weekly basis using a validation dataset.

11. The method of claim 9, wherein the stream of redundant qubits is generated by replicating the stream of input qubits at least 10 times.

12. The method of claim 9, wherein the stream of redundant qubits is generated by replicating the stream of input qubits at least 20 times.

13. The method of claim 9, wherein the stream of redundant qubits is generated by replicating the stream of input qubits at least 50 times.

14. A quantum error correction system for enhancing fidelity in quantum measurement data in a noisy quantum system, the system comprising:

(a) one or more processors configured to;
  receive a stream of input quantum bits (qubits);
  generate a stream of redundant qubits by replicating the stream of input qubits;
  transmit the stream of redundant qubits through the noisy quantum system, thereby generating a stream of noisy redundant qubits;

(b) one or more non-transitory machine-readable media storing instructions that, when executed by the one or more processors, cause the one or more processors to:
  (i) apply a Bayesian filter to the stream of noisy redundant qubits;
  (ii) apply a majority voting filter to an output of the Bayesian filter; and
  (iii) apply an AI-based filter to an output of the majority voting filter;
  wherein the filters collectively enhance the fidelity of the quantum measurement data by reducing noise.

15. The system of claim 14, wherein the fidelity is evaluated on a weekly basis using a validation dataset.

16. The system of claim 15, wherein the one or more processors are further configured to retrain the AI-based filter when the fidelity of the quantum measurement data falls below a threshold value.

17. The system of claim 16, wherein the one or more processors are further configured to update the Bayesian filter when the fidelity of the quantum measurement data falls below the threshold value.

18. The system of claim 17, wherein the threshold value is 95%.

19. The system of claim 18, wherein the stream of redundant qubits is generated by replicating the stream of input qubits at least 10 times.

* * * * *